(12) United States Patent
Chen et al.

(10) Patent No.: US 12,142,953 B2
(45) Date of Patent: Nov. 12, 2024

(54) BATTERY CHARGING PROTECTION AND HEALTH MANAGEMENT SYSTEM

(71) Applicant: Apple Inc., Cupertino, CA (US)

(72) Inventors: Baifeng Chen, San Jose, CA (US); Xingqun Li, Santa Clara, CA (US); Di Zhao, Santa Clara, CA (US); Chao Ma, San Jose, CA (US)

(73) Assignee: Apple Inc., Cupertino, CA (US)

( * ) Notice: Subject to any disclaimer, the term of this patent is extended or adjusted under 35 U.S.C. 154(b) by 521 days.

(21) Appl. No.: 17/650,322

(22) Filed: Feb. 8, 2022

(65) Prior Publication Data

US 2023/0253802 A1    Aug. 10, 2023

(51) Int. Cl.
*H02J 7/00* (2006.01)

(52) U.S. Cl.
CPC .......... *H02J 7/0013* (2013.01); *H02J 7/0031* (2013.01); *H02J 7/005* (2020.01); *H02J 2207/20* (2020.01)

(58) Field of Classification Search
CPC ........ H02J 7/0013; H02J 7/0031; H02J 7/005; H02J 2207/20; H02J 7/00302; H02J 7/00304; H02J 7/00306
USPC ....................................................... 320/137
See application file for complete search history.

(56) References Cited

U.S. PATENT DOCUMENTS

| | | | |
|---|---|---|---|
| 6,430,692 B1 | 8/2002 | Kimble et al. | |
| 6,957,048 B2 * | 10/2005 | Formenti | H02J 7/0013 455/572 |
| 8,502,503 B2 * | 8/2013 | Densham | H01M 10/42 320/156 |
| 8,575,896 B2 * | 11/2013 | Greening | G06F 1/26 320/140 |
| 10,305,298 B2 * | 5/2019 | Kristensen | H02J 7/0013 |
| 10,498,148 B2 | 12/2019 | Mergener et al. | |
| 11,228,190 B2 * | 1/2022 | Tiedtke | B60L 53/62 |
| 11,631,907 B2 * | 4/2023 | Mikuteit | H02J 7/0029 320/139 |
| 11,791,721 B2 * | 10/2023 | Chen | H02J 7/007 713/300 |
| 2005/0146223 A1 * | 7/2005 | Kanouda | H01M 10/46 307/66 |
| 2014/0028098 A1 * | 1/2014 | Trigiani | H02J 7/00302 307/38 |
| 2020/0171971 A1 * | 6/2020 | Tiedtke | B60L 5/24 |
| 2022/0223988 A1 * | 7/2022 | Cho | H02J 7/00032 |
| 2022/0314837 A1 * | 10/2022 | Gupta | H01M 10/6567 |

(Continued)

*Primary Examiner* — M Baye Diao
(74) *Attorney, Agent, or Firm* — FLETCHER YODER PC

(57) ABSTRACT

A multi-cell battery powered device can include at least one power input, a first power converter coupled between the power input and a battery bus, a second power converter coupled between the battery bus and a system load of the electronic device, a plurality of cells, and a plurality of primary battery protection switches. The primary battery protection switches can be selectively operable to couple the plurality of cells in: (1) a parallel configuration in which the cells are coupled to the battery bus so as to charge or discharge in parallel, (2) a series configuration in which the cells are coupled to the battery bus so as to charge or discharge in series, and (3) an isolated configuration in which at least one of the plurality of cells is coupled to the battery bus and at least one of the plurality of cells is disconnected from the battery bus.

21 Claims, 5 Drawing Sheets

(56) References Cited

U.S. PATENT DOCUMENTS

2023/0006450 A1\* 1/2023 Chen ..................... H02M 3/158
2024/0204539 A1\* 6/2024 Qiu ....................... H02J 7/0014

\* cited by examiner

BATTERY CHARGING PROTECTION AND HEALTH MANAGEMENT SYSTEM

BACKGROUND

Electronic devices, including portable electronic devices such as mobile telephones, tablet computers, laptop computers, etc. may use rechargeable cells for power. In some applications it may be desirable to provide multiple cells to form a battery. Historically, cells have been connected in series to provide higher voltage (at the same current), in parallel to provide higher current (at the same voltage), or in series-parallel combinations to increase both voltage and current.

SUMMARY

Depending on the mode of operation of a battery-powered electronic device, it may be more advantageous to have two or more battery cells connected in series or in parallel, or, for batteries with more than two cells, various series parallel combinations. Providing separate battery bank configuration switches can increase the complexity and cost of the electronic device. However, the complexity and cost increase can be reduced by reuse of the battery protection circuitry to perform at least a portion of the battery reconfiguration.

A multi-cell battery powered electronic device can include at least one power input, a first power converter coupled between the at least one power input and a battery bus, a second power converter coupled between the battery bus and a system load of the electronic device, a plurality of cells, and a plurality of primary battery protection switches. The primary battery protection switches can be selectively operable to couple the plurality of cells in: (1) a parallel configuration in which the cells are coupled to the battery bus so as to charge or discharge in parallel, (2) a series configuration in which the cells are coupled to the battery bus so as to charge or discharge in series, and (3) an isolated configuration in which at least one of the plurality of cells is coupled to the battery bus and at least one of the plurality of cells is disconnected from the battery bus. The at least one power input can include a unidirectional power input and a bidirectional power input. The first power converter can be a bidirectional buck-boost converter. The first power converter can be a buck converter. The second power converter can include a bypass. The plurality of primary battery protection switches can include a plurality of back-to-back switch pairs. There can be two battery cells and three back-to-back switch pairs. The multi-cell battery powered electronic device can further include two or more single primary isolation switches. There can be three battery cells, four back-to-back switch pairs, and two single primary isolation switches.

A battery charging protection and health management circuit can include a plurality of primary battery protection switches arranged in complementary pairs and a battery management controller, wherein the battery management controller can selectively operate the plurality of primary battery protection switches to couple a plurality of cells in: (1) a parallel configuration in which at least two of the plurality of cells are coupled to a battery bus so as to charge or discharge in parallel, (2) a series configuration in which at least two of the plurality of cells are coupled to the battery bus so as to charge or discharge in series, and (3) an isolated configuration in which at least one of the plurality of cells is coupled to the battery bus and at least one of the plurality of cells is disconnected from the battery bus. There can be two battery cells and three back-to-back switch pairs. The battery charging protection and health management circuit can further include two or more single primary isolation switches. There can be three battery cells, four back-to-back switch pairs, and two single primary isolation switches. The battery management controller can transition between the parallel configuration and the series configuration by executing a plurality of switching transitions. The battery management controller transitions between the parallel configuration and a first isolated configuration by executing a first switching transition and transition between the parallel configuration and a second isolated configuration by executing a second switching transition.

An electronic device can include a unidirectional power input that receives power from a wired source, a bidirectional power input that can receive power from a inductive power transfer transmitter or deliver power to an inductive power receiver, a bidirectional buck-boost converter coupled between the power inputs and a battery bus, wherein the bidirectional buck-boost converter bucks a voltage received from either of the power inputs for delivery to the battery bus and boosts a voltage from the battery bus for delivery to the bidirectional power input, a power converter coupled between the battery bus and a system load of the electronic device, a plurality of cells, and a battery protection circuit comprising a plurality of primary battery protection switches arranged in complementary pairs. The primary battery protection switches can be selectively operable to couple the plurality of cells in: (1) a parallel configuration in which the cells are coupled to the battery bus so as to charge or discharge in parallel, (2) a series configuration in which the cells are coupled to the battery bus so as to charge or discharge in series, and (3) an isolated configuration in which at least one of the plurality of cells is coupled to the battery bus and at least one of the plurality of cells is disconnected from the battery bus. The electronic device can operate with the cells in a series configuration to achieve faster charging of the cells. The electronic device can operate with the cells in a series configuration for supplying power to the bidirectional power input. The electronic device can operate with the cells in a parallel configuration to extend standby time of the electronic device. The electronic device can operate with the cells in a parallel configuration to improve operational efficiency by facilitating operation of the power converter in a bypass mode. The electronic device can operate with the cells in an isolated configuration to allow for monitoring of cell capacity performing cell health management functions.

DETAILED DESCRIPTION

Figure 1A:
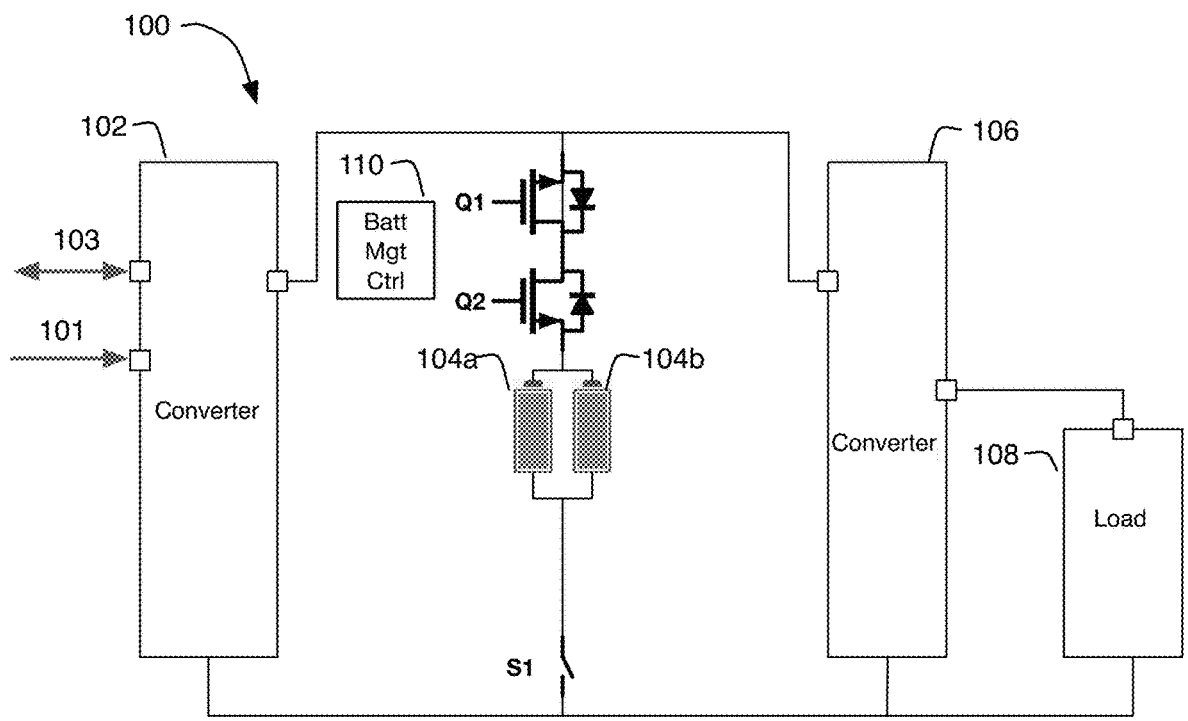
FIG. 1A illustrates an electronic device having two parallel battery cells.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one." or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1A illustrates an electronic device 100 having two parallel battery cells. Electronic device can be any of a variety of devices, including, but not limited to, a mobile phone, a tablet computer, a laptop computer, a smartwatch, or an accessory for such devices, such as wireless earphones, a stylus, etc. Electronic device 100 can include a battery made up of two cells 104a & 104b connected in parallel. The battery cells can be lithium ion (Li-ion), lithium iron phosphate (LiFePO4), or any other battery chemistry. The battery can power the system load 108 via a power converter 106. The power converter can be a buck converter that reduces the battery voltage (e.g., ~3.5 to 4V) to the voltage required by the system load (e.g., 1.8V). Additionally, power converter 106 may be configured to operate in a bypass mode when the battery voltage is suitably near the required voltage of system load 108. In some applications, converter 106 could be a boost converter that boosts the voltage received from the battery to a level required for system load 108. Such a boost converter could also be provided with a bypass for use when the battery voltage corresponds to the system load.

System load 108 may include a power management unit (PMU) that distributes power to each of the subsystems of electronic device 100, such as a processing subsystem (including processor, storage, memory, etc.), a communication subsystem (including cellular, WiFi, Bluetooth, and/or other radios), an I/O subsystem (including a display, input device(s), microphone(s), loudspeaker(s), etc.). System load 108 may also or alternatively include a system on a chip (SoC) that integrates some or all of the electronic device subsystems into a single integrated circuit.

Electronic device 100 can receive power from one or more external power sources 101 & 103. These external power sources can include a unidirectional source 101, which can only deliver power to electronic device 100, or a bidirectional source 103, which can either deliver power to electronic device 100 or which electronic device 100 can deliver power to. As one non-limiting example, external power source 101 may be a wired power source, such as a port for a charging cable, and external power source 103 can be a wireless power source, such as an inductive charging system. The inductive power system may be configured to receive power from an inductive power transmitter (not shown) to charge battery 104 and/or provide operating power for system load 108. The inductive power system may further be configured to deliver power from battery 104 to an inductive power receiver (not shown). For example, electronic device 100 can be a mobile phone, and bidirectional source 103 can be a wireless power system that can either charge the phone battery from a wireless power transmitter or can charge an accessory device (e.g., wireless headphones) from the phone battery. Notwithstanding the foregoing example, it should be understood that each power source, i.e., either unidirectional source 101 or bidirectional source 103 could be either wired or wireless.

The input power source(s) 101 & 103 can be coupled to a power converter 102. Power converter 102 can be a buck converter that reduces the voltage from the input source(s) to a level suitable for battery charging. The suitable battery charging voltage will vary with the battery's state of charge, and also potentially other variables, such as battery age, number of cycles, temperature, etc. The regulation circuitry of converter 102 can be coupled to a battery management controller 110 that can set the appropriate battery charging target voltage. In some cases, converter 102 could also be a bi-directional buck-boost converter, allowing the voltage supplied by battery 104 to be stepped up to a level suitable for powering a device coupled to a bidirectional power source 103.

The battery management and protection functions performed by battery management controller 110 could be implemented in a common controller or separate controllers. The controller(s) can be implemented in a variety of ways, such as a microcontroller with appropriate firmware programming. Electronic device 100 can also include primary battery protection switches Q1 & Q2, operable by battery management controller 110 to disconnect battery 104 in the event of a fault condition (overvoltage, overcurrent, overtemperature, etc.). The primary protection switches may be implemented as back-to-back switching devices, such as a p-channel and an n-channel MOSFET, allowing battery current in either direction (i.e., charging or discharging current) to be blocked. The battery protection circuitry can also include a further secondary battery protection switch S1, which can be implemented using any suitable switching technology, including either semiconductor switching or even mechanical switching, such as a relay, if appropriate for a given application.

Figure 1B:
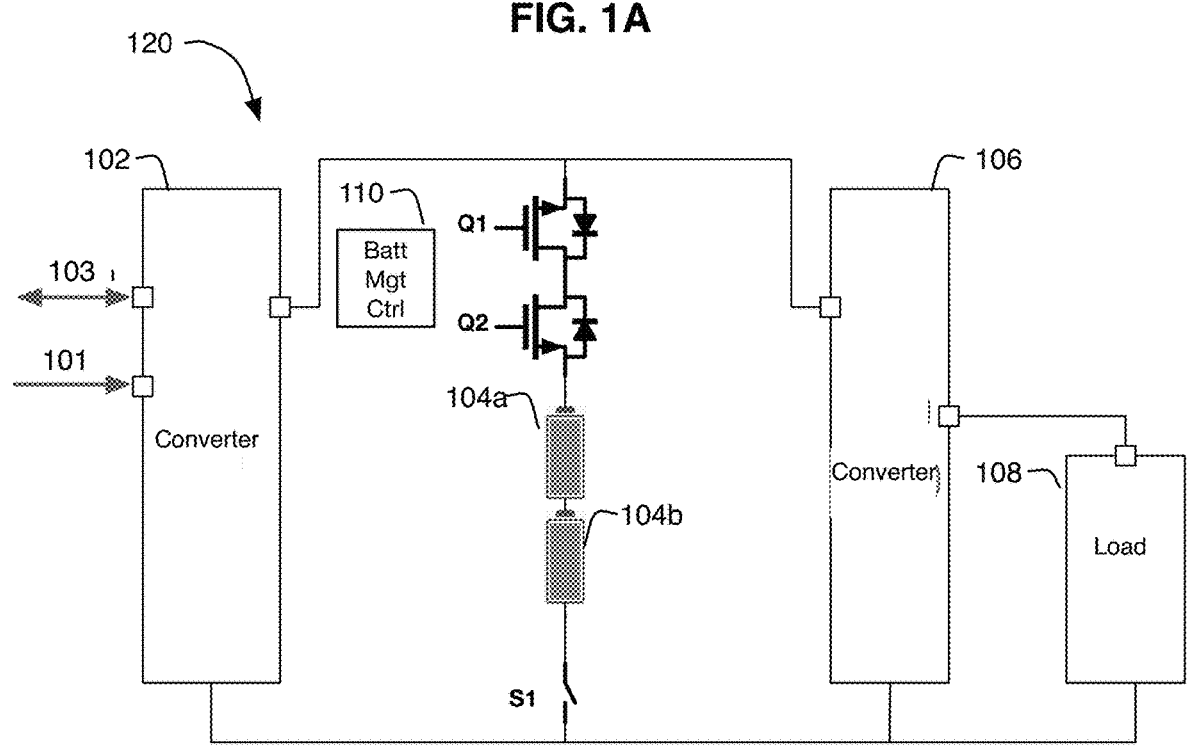
FIG. 1B illustrates an electronic device having two series battery cells.

FIG. 1B illustrates an electronic device 120 having two series battery cells. Electronic device 120 can be otherwise substantially similar to electronic device 100, described above. Depending on the particular configuration and requirements of a given electronic device, either the parallel or series configuration can have advantages. For example, a series configuration may be charged faster than a parallel configuration because of the higher voltage that can be applied, although this may come at the additional cost of requiring boost functionality in converter 102. A parallel configuration may exhibit higher efficiency, and therefore longer battery life, because the step down operation performed by converter 106 can be more efficient for a smaller voltage step.

Figure 2:
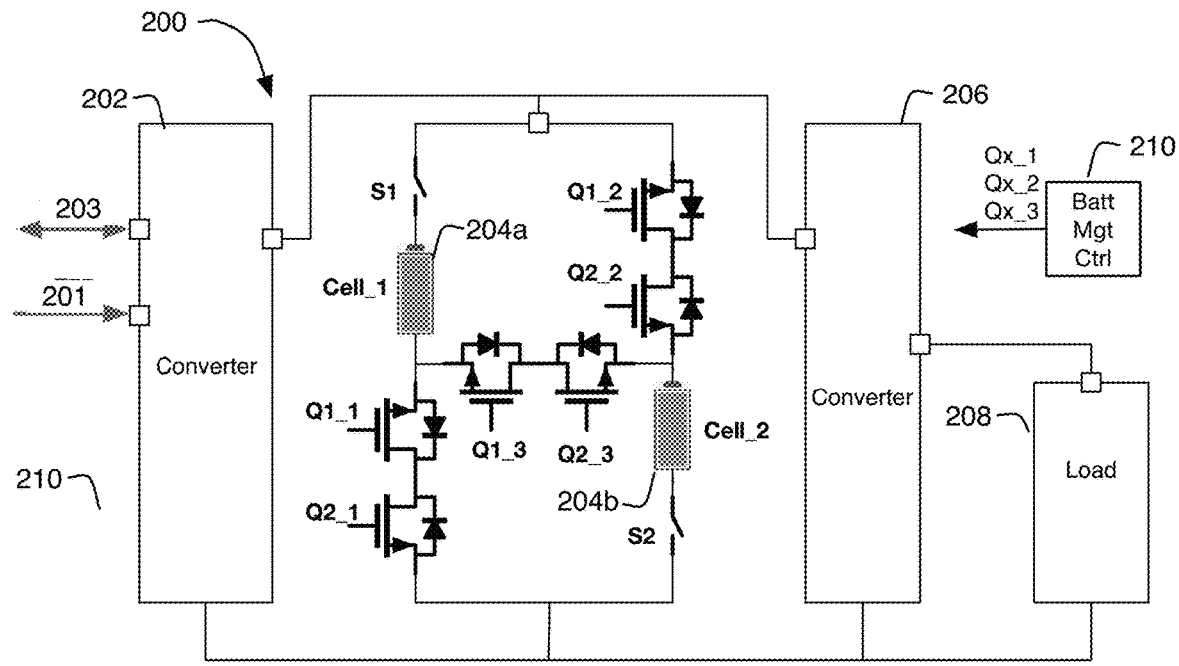
FIG. 2 illustrates an electronic device having a battery charging protection and health management circuit that allows for two battery cells to be connected in different operating modes.

FIG. 2 illustrates an electronic device 200 having a battery charging protection and health management circuit that allows for two battery cells 204a & 204b to be connected in series or in parallel in different operating modes. Electronic device can be any of a variety of devices, including, but not limited to, a mobile phone, a tablet computer, a laptop computer, a smartwatch, or an accessory for such devices, such as wireless earphones, a stylus, etc. Electronic device 200 can include a battery made up of two cells 204a & 204b. The battery cells can be lithium ion (Li-ion), lithium iron phosphate (LiFePO4), or any other battery chemistry. The battery can power the system load 208 via a power converter 206. The power converter can be a buck converter that reduces the battery voltage (e.g., ~3.5 to 4V) to the voltage required by the system load (e.g., 1.8V). Additionally, power converter 206 may be configured to operate in a bypass mode when the battery voltage is suitably near the required voltage of system load 208. In some applications, converter 206 could be a boost converter that boosts the voltage received from the battery to a level required for system load 208. Such a boost converter could also be provided with a bypass for use when the battery voltage corresponds to the system load.

System load 208 may include a power management unit (PMU) that distributes power to each of the subsystems of electronic device 200, such as a processing subsystem (including processor, storage, memory, etc.), a communication subsystem (including cellular, WiFi, Bluetooth, and/or other radios), an I/O subsystem (including a display, input device(s), microphone(s), loudspeaker(s), etc.). System load 208 may also or alternatively include a system on a chip (SoC) that integrates some or all of the electronic device subsystems into a single integrated circuit.

Electronic device 200 can receive power from one or more external power sources 201 & 203. These external power sources can include a unidirectional source 201, which can only deliver power to electronic device 200, or a bidirectional source 203, which can either deliver power to electronic device 200 or which electronic device 200 can deliver power to. As one non-limiting example, external power source 201 may be a wired power source, such as a port for a charging cable, and external power source 203 can be a wireless power source, such as an inductive charging system. The inductive power system may be configured to receive power from an inductive power transmitter (not shown) to charge battery 204 and/or provide operating power for system load 208. The inductive power system may further be configured to deliver power from battery 204 to an inductive power receiver (not shown). For example, electronic device 200 can be a mobile phone, and bidirectional source 203 can be a wireless power system that can either charge the phone battery from a wireless power transmitter or can charge an accessory device (e.g., wireless headphones) from the phone battery. Notwithstanding the foregoing example, it should be understood that each power source, i.e., either unidirectional source 201 or bidirectional source 203 could be either wired or wireless.

The input power source(s) 201 & 203 can be coupled to a power converter 202. Power converter 202 can be a buck converter that reduces the voltage from the input source(s) to a level suitable for battery charging. The suitable battery charging voltage will vary with the battery's state of charge, and also potentially other variables, such as battery age, number of cycles, temperature, etc. The regulation circuitry of converter 202 can be coupled to a battery management controller 210 that can set the appropriate battery charging target voltage. In some cases, converter 202 could also be a bi-directional buck-boost converter, allowing the voltage supplied by battery 204 to be stepped up to a level suitable for powering a device coupled to a bidirectional power source 203.

The battery management and protection functions performed by battery management controller 210 could be implemented in a common controller or separate controllers. The controller(s) can be implemented in a variety of ways, such as a microcontroller with appropriate firmware programming. Electronic device 200 can also include primary battery protection switch pairs Q1_1 & Q2_1, Q2_1 & Q2_2, and Q1_3 & Q2_3, operable by battery management controller 210 not just to disconnect battery 204 in the event of a fault condition (overvoltage, overcurrent, overtemperature, etc.), but also to reconfigure the battery to either a series configuration (discussed below with respect to FIG. 3A), a parallel configuration (discussed below with respect to FIG. 3B), or an isolated single cell configuration (discussed below with respect to FIG. 3C). The primary protection switches may be implemented as back-to-back switching devices, such as a p-channel and an n-channel MOSFET, allowing battery current in either direction (i.e., charging or discharging current) to be blocked. The battery protection circuitry can also include further secondary battery protection switch S1 & S2, which can be implemented using any suitable switching technology, including either semiconductor switching or even mechanical switching, such as a relay, if appropriate for a given application.

A first battery protection switch pair Q1_1 and Q2_1 may be connected in series with a first battery cell 204a, for example between the negative battery bus and the negative terminal of battery cell 204a. Similarly, a second battery protection switch pair Q1_1 and Q2_2 may be connected in series with a second battery cell 204b, for example between the positive battery bus and the positive terminal of battery cell 204b. A third battery protection switch pair Q1_3 and Q2_3 may be connected between the junction points of the respective cells 204a & 204b and the corresponding protection switch pairs. Battery management controller 210 can provide the drive signals to each of the primary protection switches to select the desired battery configuration (discussed below with respect to FIG. 4).

Figure 3A:
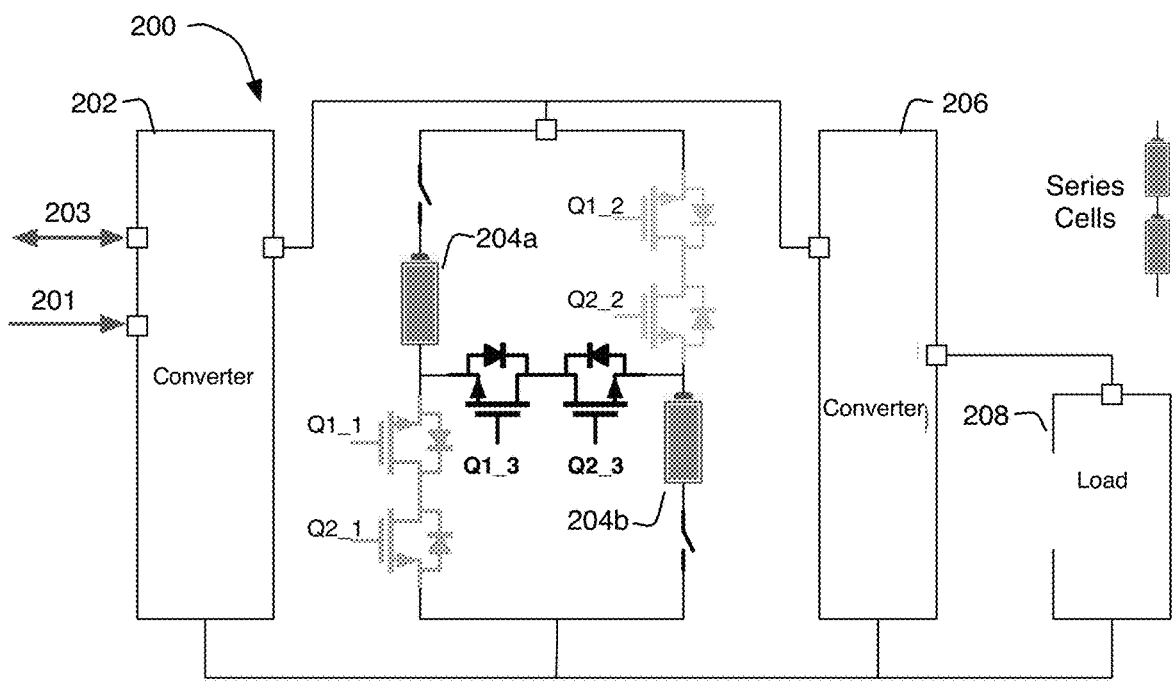
FIG. 3A illustrates an electronic device having a battery charging protection and health management circuit with two battery cells connected in a series operating mode.

FIG. 3A illustrates an electronic device 200 having a battery charging protection and health management circuit with two battery cells 204a & 204b connected in a series operating mode. To achieve the series operating mode, battery management controller 210 (FIG. 2) can open primary battery protection switch pairs Q1_1 & Q2_1 and Q1_2 & Q2_2. Additionally, battery management controller 210 can close primary battery protection switch pair Q1_3 and Q2_3. This provides a series connection of cells 204a and 204b that provides a charging current path from the positive battery bus, through cell 204a, through primary battery protection switch pair Q1_3 and Q2_3, through cell 204b, to the negative battery bus and a discharging current path from the negative battery bus, through cell 204b, through primary battery protection switch pair Q1_3 and Q2_3, through cell 204a, to the positive battery bus. Secondary battery protection switches S1 and S2 may operate as normal in the series mode, and primary protection switch pair Q1_3 and Q2_3 may provide primary protection for both cells 204a and 204b.

Figure 3B:
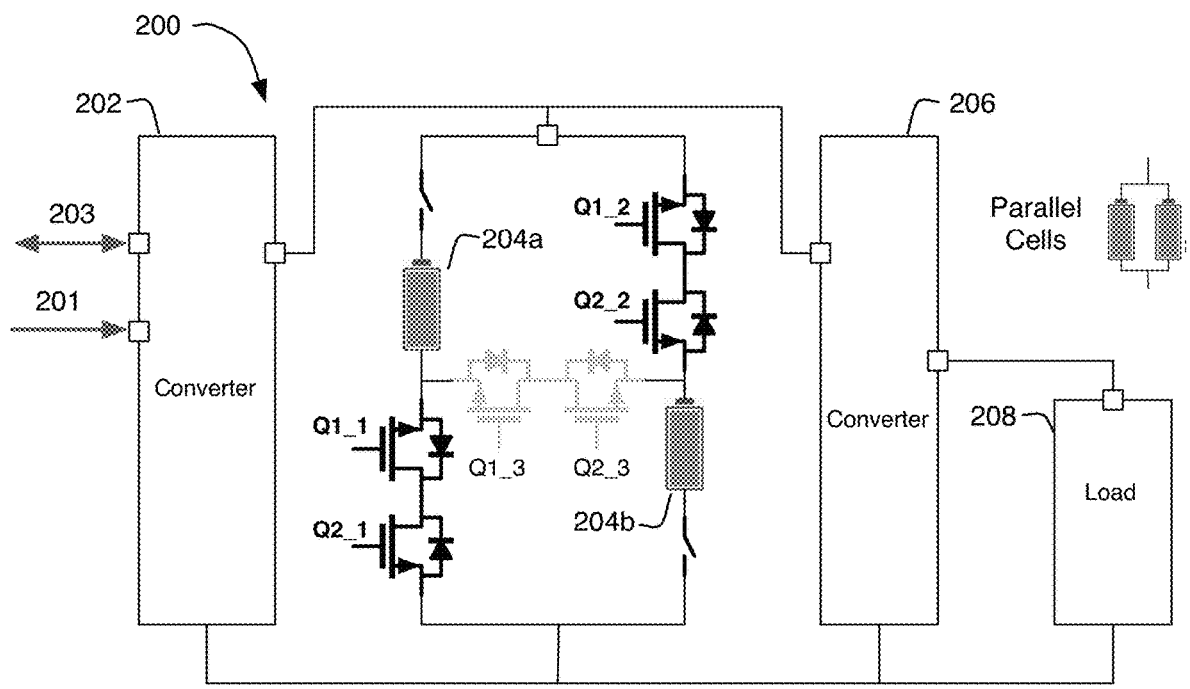
FIG. 3B illustrates an electronic device having a battery charging protection and health management circuit with two battery cells connected in a parallel operating mode.

FIG. 3B illustrates an electronic device 200 having a battery charging protection and health management circuit with two battery cells 204a & 204b connected in a parallel operating mode. To achieve the parallel operating mode, battery management controller 210 (FIG. 2) can open primary battery protection switch pair Q1_3 & Q2_3 and close primary battery protection switch pairs Q1_1 & Q1_2 and Q1_2 & Q2_2. This provides a parallel connection of cells 204a and 204b that provides a charging current path from the positive battery bus, through each of cells 204a & 204b and their corresponding primary battery protection switch pairs Q1_1 & Q2_1 and Q1_2 and Q2_2 to the negative battery bus. A corresponding discharging current path from the negative battery bus through each of cells 204a & 204b and their corresponding primary battery protection switch pairs Q1_1 & Q2_1 and Q1_2 and Q2_2 to the positive battery bus. Secondary battery protection switches S1 and S2 may operate as normal in the parallel mode, and primary protection switch pairs Q1_1 & Q2_1 and Q1_2 and Q2_2 may provide primary protection for their respective cells 204a and 204b.

Figure 3C:
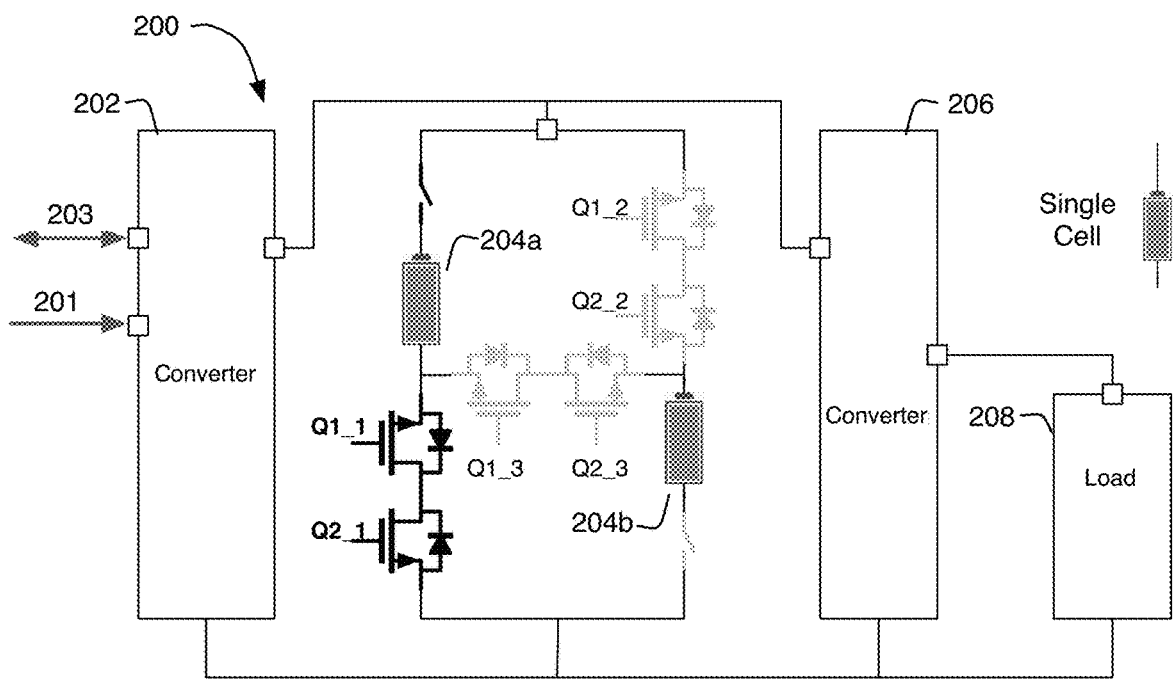
FIG. 3C illustrates an electronic device having a battery charging protection and health management circuit with two battery cells in a single-cell isolated operating mode.

FIG. 3C illustrates an electronic device 200 having a battery charging protection and health management circuit with two battery cells 204a & 204b in a single-cell isolated operating mode. To achieve the single-cell isolated operating mode, battery management controller 210 (FIG. 2) can open primary battery protection switch pair Q1_3 & Q2_3 and close one of primary battery protection switch pairs Q1_1 & Q1_2 or Q1_2 & Q2_2. Closing switch pair Q1_1 & Q2_1 will provide for charging and discharging current paths through cell 204a, while isolating cell 204b. Alternatively, closing switch pair Q1_2 and Q2_2 will provide for charging and discharging current paths through cell 204b, while isolating cell 204b. In either mode, Secondary battery protection switches S1 and S2 may operate as normal, and primary protection switch pairs Q1_1 & Q2_1 and Q1_2 and Q2_2 may provide primary protection for their respective cells 204a and 204b.

The ability of electronic device 200 to selectively configure cells 204a and 204b in series, parallel, or isolated modes can provide for various operational advantages. For example, connecting the cells in series can allow for improved charging rates and efficiency when charging battery 204 from any of the available input power sources. Additionally, connecting the cells in series can provide for extended operation time because the higher voltage afforded can provide sufficient voltage to operate the various subsystems of electronic device 200—particularly those requiring higher voltages, such as communication system radios—even at lower depths of discharge. Similarly, when using supplying power to an external device via the bidirectional power source 203, such as wireless power transfer to a wireless receiver, the higher series voltage of the cells can eliminate the need for a boost converter to increase the voltage for wireless power transfer and/or improve the operating efficiency and/or power density of such a boost converter by reducing the amount of boost required. Conversely, parallel mode connection may be advantageously employed at the beginning or end of battery charging, depending on the charging voltage or current required per cell. Additionally, operating in the parallel mode can improve operating efficiency (and therefore standby time) by improving the efficiency of buck converter 206 or allowing it to be bypassed. Operating in a single cell mode can allow for improved monitoring of cell capacity, because the battery management controller can perform battery tests on either isolated cell without interference from (or without interfering with) normal device operation. Additionally, health management functions (for example wear or number of cycle equalization) can be performed by isolation a more worn or more cycled battery and cycling the other cell alone to "catch up." Each of these foregoing operating mode advantages may be selected as appropriate by suitable programming and algorithms in either the main system processor (e.g., part of system load 208), by the battery management controller 210, or by any other suitable controller.

Figure 4:
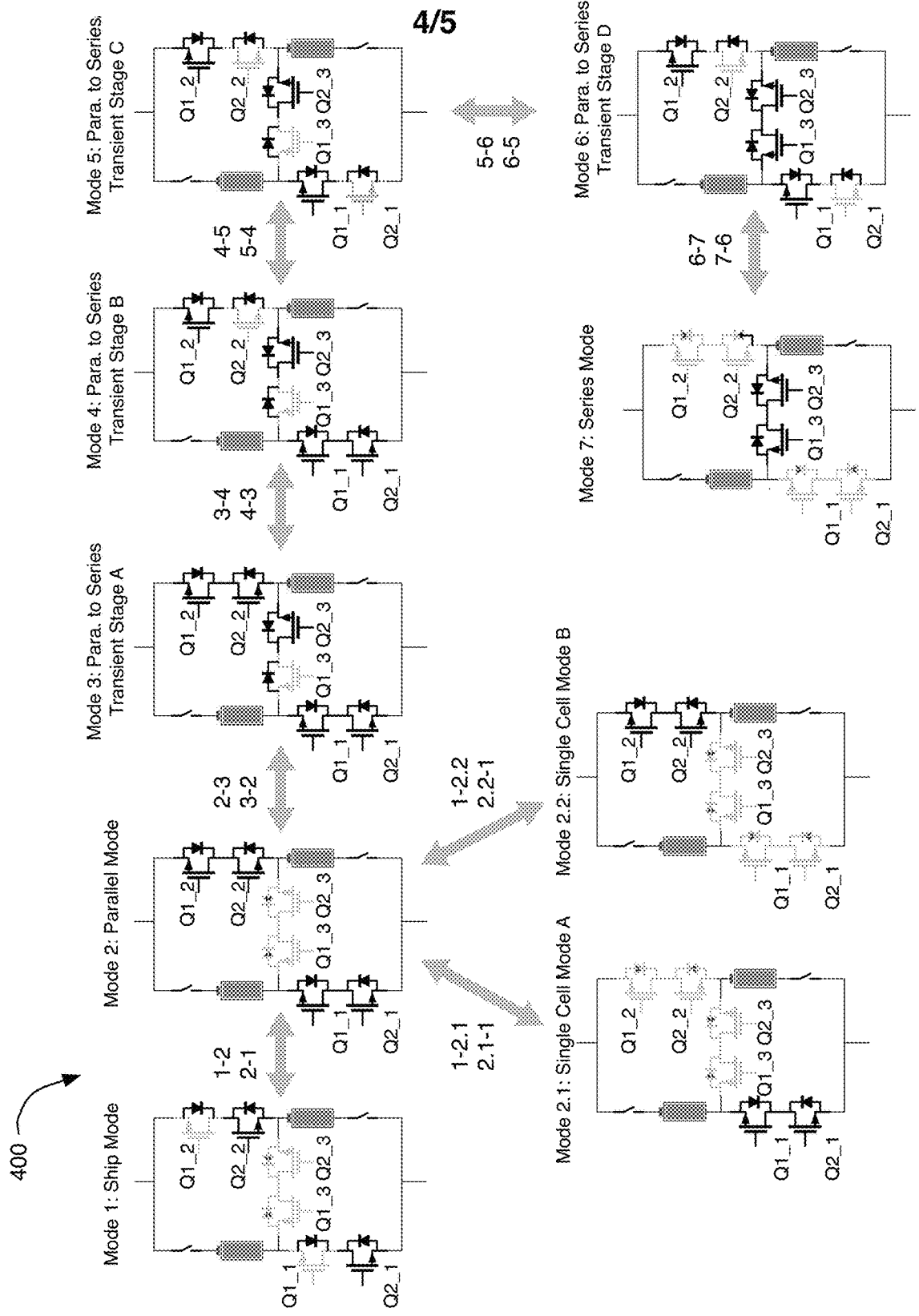
FIG. 4 illustrates switching sequences of a battery charging protection and health management circuit that allows for two battery cells to be connected in different operating modes, further illustrating switching transitions among the different operating modes.

FIG. 4 illustrates switching sequences 400 of a battery charging protection and health management circuit that allows for two battery cells to be connected in different operating modes, further illustrating switching transitions among the different operating modes. Beginning in the upper left corner of FIG. 4, Mode 1: Ship Mode is illustrated. In this mode, at least protection switches Q1_1, Q1_2, and Q1_3 and Q2_3 are turned off, which completely disconnects the battery. This mode can allow for shipping of the device from the manufacturer to the retailer or end user, as the cells are protected from excessive discharge or other current/voltage related faults. Upon initial activation, the battery management controller can execute transition 1-2 to move to Mode 2: Parallel Mode. The battery management controller could also later move from Mode 2: Parallel Mode back to Mode 1: Ship Mode by executing transition 2-1, which is the reverse of transition 1-2. Transition 1-2 includes closing at least switches Q1_1 and Q1_2 such that first primary protection switch pair Q1_1 & Q2_1 is closed and second primary protection switch pair Q1_2 and Q2_2 are closed. This provides the parallel mode discussed above with respect to FIG. 3B.

From Mode 2: Parallel Mode the battery charging protection and health management circuit can transition to one of three different modes. Mode 2.1: Single Cell Mode A is a mode in which only the left cell (204a) is used. Mode 2.2: Single Cell Mode B is a mode in which only the right cell (204b) is used. Mode 3: Parallel to Series Transient Stage A begins the process of transitioning to the series mode (i.e., Mode 7: Series Mode). To go from Mode 2: Parallel Mode to Mode 2.1: Single Cell Mode A, the battery management controller can execute transition 2-2.1, which can include opening primary protection switch pair Q1_2 & Q2_2. This isolates the right cell (204b) and causes the system to operate solely from the left cell (204a). This corresponds to the single cell mode illustrated above in FIG. 3C. The reverse transition 2.1-2 can be performed to go from Mode 2.1: Single Cell Mode A back to Mode 2: Parallel Mode. Alternatively, to go from Mode 2: Parallel Mode to Mode 2.2: Single Cell Mode B, the battery management controller can execute transition 2-2.2, which can include opening primary protection switch pair Q1_1 & Q2_1. This isolates the left cell (204a) and causes the system to operate solely from the right cell (204b). This is the counterpart of the single cell mode illustrated above in FIG. 3C. The reverse transition 2.2-2 can be performed to go from Mode 2.2: Single Cell Mode B back to Mode 2: Parallel Mode.

To transition from the parallel mode (i.e., Mode 2: Parallel Mode) to the series mode (i.e., Mode 7: Series Mode) a sequence of transition may be employed. As a first step, transition 2-3 may be executed in which switch Q2_3 is closed to transition from Mode 2: Parallel Mode to Mode 3: Parallel to Series Transient Stage A. In Mode 3: Parallel to Series Transient Stage A, if the cells were discharging in parallel (Mode 2: Parallel Mode), then they will continue to discharge in parallel, as Q1 still blocks series discharging current from right cell 204b through left cell 204a. However, if the cells were charging in parallel (Mode 2: Parallel Mode), then closing switch Q2_3 begins to provide a current path for series charging current, although no charging current will initially flow because of the respective potentials of the negative terminal of left cell 204a, which is at the negative battery rail voltage, and right cell 204b, which is at the cell voltage of right cell 204b. In other words, the intrinsic body diode of switch Q1_3 will be reverse biased and thus the series charging current will be blocked.

Next, the battery management controller can execute transition 3-4 to go from Mode 3: Series to Parallel Transient Stage A to Mode 4: Series to Parallel Transient Stage B. This can be accomplished by turning off primary protection switch Q2_2. If the cells were discharging in parallel, this provides no change, as the discharging current of the right cell 204b can continue to flow through the intrinsic body diode of primary protection switch Q2_2. The discharging current of the left cell 204a is unaffected by switching in the right leg. However, if the cells were charging in parallel, this interrupts the charging current to the right cell 204b, as switch Q2_2 is turned off, and the intrinsic body diode of switch Q2_2 is reverse biased. However, left cell 204a will continue to charge.

Then, the battery management controller can execute transition 4-5 to go from Mode 4: Series to Parallel Transient Stage B to Mode 5: Series to Parallel Transient Stage C. This can be accomplished by turning off primary protection switch Q2_1. If the cells were discharging in parallel, this results in no change because the discharging current of left cell 204a can continue to flow through the intrinsic body diode of primary protection switch Q2_1. Likewise, discharging current will continue to flow through the intrinsic body diode of primary protection switch Q2_2 as in Mode 4: Series to Parallel Transient Stage B. Alternatively, if the cells were charging in parallel, then turning off primary protection switch Q2_1 will interrupt the charging current to left cell 204a because primary protection switch Q2_1 is off and its intrinsic body diode is reverse biased. It should be noted that even though the batteries would not be charging at this point, the battery bus is still energized by one of the input sources, and thus the device remains powered.

Next, the battery management controller can execute transition 5-6 to go from Mode 4: Series to Parallel Transient Stage C to Mode 6: Parallel to Series Transient Stage D. This can be accomplished by turning on primary protection switch Q1_3. If the cells were discharging in parallel, they will now discharge in series because the negative terminal of left cell 204a is brought up to the potential of the positive terminal of right cell 204b, which has the effect of reverse-biasing the intrinsic body diode of primary protection switch Q2_1. If the cells were charging in parallel (with that charging interrupted in Mode 5: Parallel to Series Transient Stage C), they can now begin charging in series because the current path through left cell 204a, primary protection switch pair Q1_3 & Q2_3, and right cell 204b is now completed.

As the final step of the parallel-to-series transition, the battery management controller can execute transition 6-7 to go to Mode 7: Parallel Mode. This transition may be accomplished by opening primary protection switches Q1_1 and Q2_1 which completely disconnects the individual leg paths. Thus, the complete transition from a parallel cell configuration (i.e., Mode 2: Parallel Mode) to a series cell configuration (i.e., Mode 7: Series Mode) can include successive transitions 2-3, 3-4, 4-5, 5-6, and 6-7. The reverse, i.e., a transition from a series cell configuration (i.e., Mode 7: Series Mode) to a parallel cell configuration (i.e., Mode 2: Parallel Mode) can be achieved by executing successive transitions 7-6, 6-5, 5-4, 4-3, 3-2 as described below.

Beginning in the series mode (Mode 7: Series Mode), the battery management controller can execute transition 7-6 to go to Mode 6: Transient Stage D. This transition (corresponding to transition 6-7 discussed above) can include turning on primary protection switches Q1_1 and Q1_2. If the battery was either charging or discharging in series, current will continue to flow along the same path. Then, the battery management controller can execute transition 6-5 to go from mode 6: Transient Stage D to Mode 5: Transient Stage C. This can include turning off primary protection switch Q1_3. If the cells were discharging in series, they will now start discharging in parallel because primary protection switch Q1_3 is off, and its intrinsic body diode is reverse biased. However, primary protection switches Q1_1 and Q1_2 being on provides for a discharge path through each cell (and the intrinsic body diodes of primary protection switches Q2_1 and Q2_2. Alternatively, if the cells were charging in series, they will continue charging in series, as the charging current can flow through the intrinsic body diode of primary protection switch Q1_3, but parallel charging current will be blocked by the reverse-biased intrinsic body diodes of primary protection switches Q2_1 and Q2_2.

Continuing the transition to series mode, the battery management controller can execute transition 5-4 (corresponding to transition 4-5 discussed above) in which primary protection switch Q2_1 can be turned on. If the cells were discharging in series they will have already transitioned to parallel discharge in Mode 5, so things will continue as normal, except that the current through left cell 204a will flow through the channel of primary protection switch Q2_1 rather than the intrinsic body diode. Alternatively, if the cells were charging in series, left cell 204a will begin charging alone because its negative terminal will now be at the negative battery bus rail potential. Charging current to right cell 204b will be momentarily interrupted. Then, the battery management controller can execute transition 4-3 (corresponding to transition 3-4 discussed above) in which primary protection switch Q2_2 is turned on, establishing a parallel charging path through right cell 204b. Then, to complete the transition, the battery management controller can execute transition 3-2 (corresponding to transition 2-3 discussed above) in which primary protection switch Q2_3 is turned off, completely disconnecting the series current flow path, which is no longer in use.

The above-described switching sequences have been described based on the assumption that the primary protection switches are MOSFETs, which have intrinsic body diodes. However, if desired for a given application, other switching device types could be provided with the addition of diodes or other circuit paths corresponding to the intrinsic body diodes of the MOSFETs as described above. Additionally, depending on the direction of the transition, certain transitions could be executed simultaneously without negatively impacting the transition. For example, when transitioning from parallel to series, transition 2-3 (which does not change current flows) could be executed substantially contemporaneously with transition 3-4. Similarly, when transitioning from series to parallel, transition 7-6 (which does not change current flow) could be executed substantially contemporaneously with transition 6-5.

Figure 5:
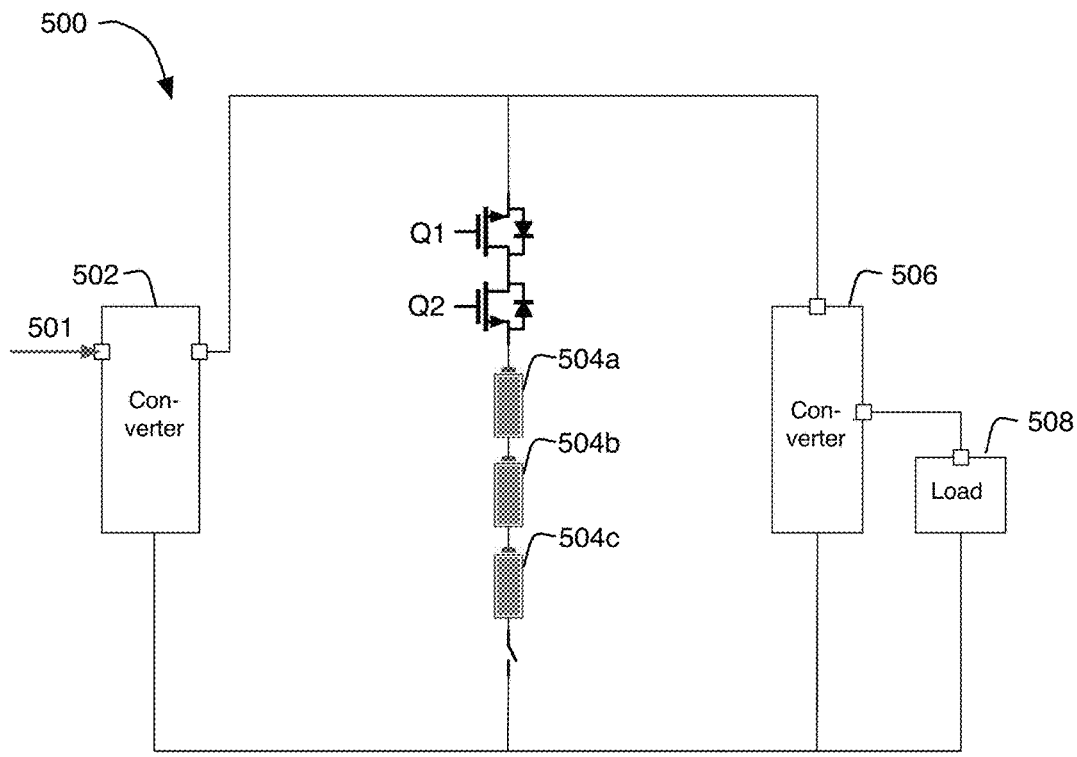
FIG. 5 illustrates an electronic device having three series battery cells.

FIG. 5 illustrates an electronic device 500 having three series battery cells 504a, 504b & 504c connected in series. Electronic device 500 also includes a power source 501, converter 502, converter 506, and load 508, which can generally correspond to similarly numbered elements discussed above with respect to FIGS. 1-3C. In some embodiments, input source 501 could be a bidirectional source and could be, for example, a USB-C® or Thunderbolt® port of a device such as a laptop computer. To take advantage of the ability to reconfigure the battery as described above, additional battery protection switches may be provided as illustrated in FIG. 6.

Figure 6:
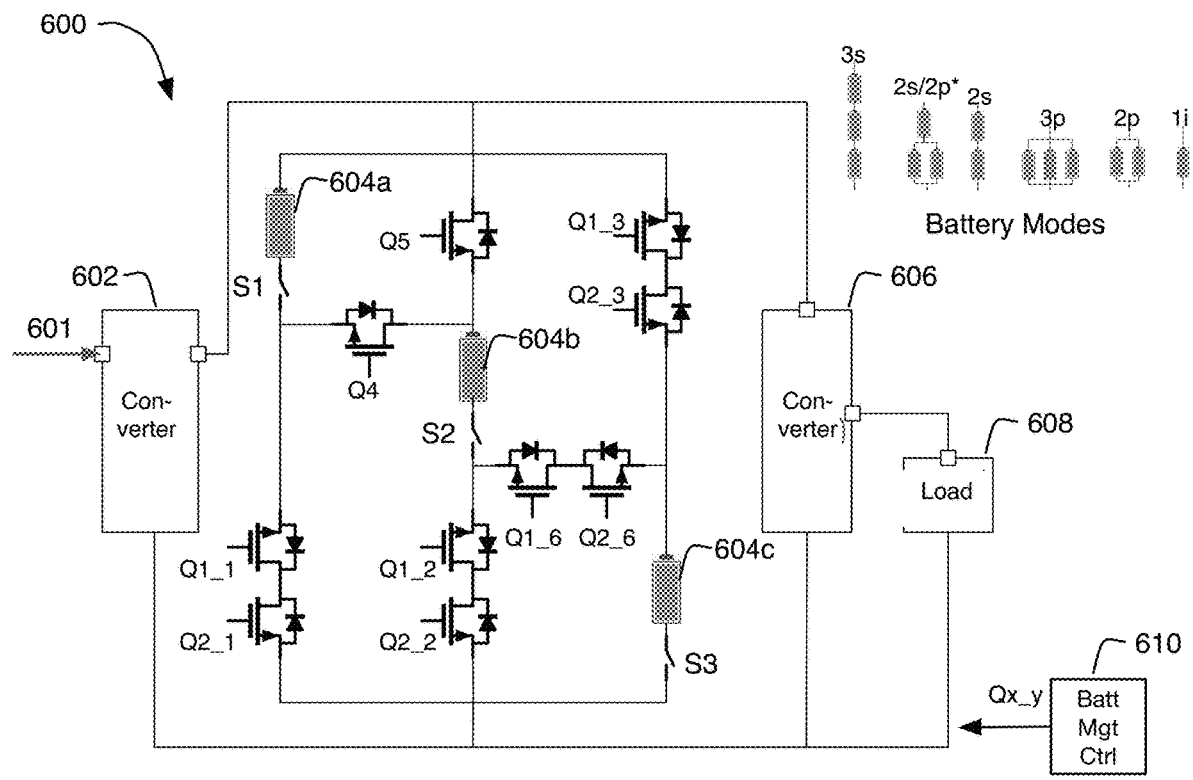
FIG. 6 illustrates an electronic device having a battery charging protection and health management circuit that allows for three battery cells to be connected in different operating modes.

FIG. 6 illustrates an electronic device 600 having a battery charging protection and health management circuit that allows for three battery cells 604a, 604b & 604c to be connected in different operating modes. Electronic device 600 also includes a power source 601, converter 602, converter 606, and load 608, which can generally correspond to similarly numbered elements discussed above with respect to FIGS. 1-3C. A first mode can include all three cells in series (3s). A second mode can include a modified two-in series, two in parallel mode (2s/2p*). In a normal 2s/2p mode, four cells would be provided with two parallel pairs of cells connected in series. In the modified mode shown in FIG. 6, because there are only three cells, a first cell is connected in series with a pair of the other cells in parallel. A third mode can include two cells in series (2s) with the third cell being isolated, e.g., for health management or status monitoring as described above. A fourth mode can include all three cells in parallel (3p). A fourth mode can include two cells in parallel (2p) with the third cell isolated for health management or status monitoring as described above. A fifth mode can include a single isolated cell, with the other two cells also isolated for health management or status monitoring.

The three-cell embodiment of FIG. 6 can include the per-cell back-to-back primary protection switch pairs Q1_1 & Q1_2 (for left cell 604a), Q1_2 & Q2_2 (for center cell 604b), and Q1_3 & Q2_3 (for right cell 604c). Additional protection devices Q4 and Q5 (single switches) as well as additional protection device pair Q1_6 and Q2_6 may also be provided. The addition of the extra protection devices may be accomplished at relatively low cost and spatial volume requirements by incorporating them on the same integrated circuit die as the ordinarily required protection switches. All of the protection switches may be operated by battery management controller 610. For the 3p mode, each of switch pairs Q1_1 & Q2_1, Q1_2 & Q2_2 and Q1_3 & Q2_3 can be turned on, with the remaining switches off. For the 3s mode, switch pair Q1_6 and Q2_6 may be turned on, along with switch Q4, with all other switches off. The switching configurations necessary for the other configurations can be derived from the teachings herein, and thus will not be spelled out in detail. Likewise, the necessary transitions between the respective modes can be derived. In general, the requirements of the switching transition are: (1) do not short circuit any cell and (2) do not interrupt all discharge paths to the system load 608 simultaneously. Otherwise, secondary protection devices S1, S2 & S3 may be as described above with respect to FIGS. 1-3C.

The foregoing describes exemplary embodiments of electronic devices with batteries that can be reconfigured by the battery protection circuitry as desired for improved efficiency, status monitoring and health management. Such systems may be used in a variety of applications but may be particularly advantageous when used in conjunction with portable electronic devices including, but not limited to, laptop computers, tablet computers, mobile phones, and their associated accessories. However, any multi-cell battery system for which the above-described or similar advantages are desired may advantageously employ the techniques described herein. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be construed to limit the scope of the disclosure. Various modifications and changes can be made to the principles and embodiments herein without departing from the scope of the disclosure and without departing from the scope of the claims.

The invention claimed is:

1. A multi-cell battery powered electronic device comprising:
   at least one power input;
   a first power converter coupled between the at least one power input and a battery bus;
   a second power converter coupled between the battery bus and a system load of the electronic device;
   a plurality of cells; and
   a plurality of primary battery protection switches, wherein the primary battery protection switches are selectively operable to couple the plurality of cells in:
      a parallel configuration in which the cells are coupled to the battery bus so as to charge or discharge in parallel;
      a series configuration in which the cells are coupled to the battery bus so as to charge or discharge in series; and
      an isolated configuration in which at least one of the plurality of cells is coupled to the battery bus and at least one of the plurality of cells is disconnected from the battery bus.

2. The multi-cell battery powered electronic device of claim 1 wherein the at least one power input comprises a unidirectional power input and a bidirectional power input.

3. The multi-cell battery powered electronic device of claim 2 wherein the first power converter is a bidirectional buck-boost converter.

4. The multi-cell battery powered electronic device of claim 1 wherein the first power converter is a buck converter.

5. The multi-cell battery powered electronic device of claim 1 wherein the second power converter includes a bypass.

6. The multi-cell battery powered electronic device of claim 1 wherein the plurality of primary battery protection switches comprise a plurality of back-to-back switch pairs.

7. The multi-cell battery powered electronic device of claim 6 wherein there are two battery cells and three back-to-back switch pairs.

8. The multi-cell battery powered electronic device of claim 6 further comprising two or more single primary isolation switches.

9. The multi-cell battery powered electronic device of claim 8 wherein there are three battery cells, four back-to-back switch pairs, and two single primary isolation switches.

10. A battery charging protection and health management circuit comprising:
a plurality of primary battery protection switches arranged in complementary pairs; and
a battery management controller;
wherein the battery management controller selectively operates the plurality of primary battery protection switches to couple a plurality of cells in:
  a parallel configuration in which at least two of the plurality of cells are coupled to a battery bus so as to charge or discharge in parallel;
  a series configuration in which at least two of the plurality of cells are coupled to the battery bus so as to charge or discharge in series; and
  an isolated configuration in which at least one of the plurality of cells is coupled to the battery bus and at least one of the plurality of cells is disconnected from the battery bus.

11. The battery charging protection and health management circuit of claim 10 wherein there are two battery cells and three back-to-back switch pairs.

12. The battery charging protection and health management circuit of claim 10 further comprising two or more single primary isolation switches.

13. The battery charging protection and health management circuit of claim 12 wherein there are three battery cells, four back-to-back switch pairs, and two single primary isolation switches.

14. The battery charging protection and health management circuit of claim 10 wherein the battery management controller transitions between the parallel configuration and the series configuration by executing a plurality of switching transitions.

15. The battery charging protection and health management circuit of claim 10 wherein the battery management controller transitions between the parallel configuration and a first isolated configuration by executing a first switching transition and transition between the parallel configuration and a second isolated configuration by executing a second switching transition.

16. An electronic device comprising:
a unidirectional power input that receives power from a wired source;
a bidirectional power input that can receive power from a inductive power transfer transmitter or deliver power to an inductive power receiver;
a bidirectional buck-boost converter coupled between the power inputs and a battery bus, wherein the bidirectional buck-boost converter bucks a voltage received from either of the power inputs for delivery to the battery bus and boosts a voltage from the battery bus for delivery to the bidirectional power input;
a power converter coupled between the battery bus and a system load of the electronic device;
a plurality of cells; and
a plurality of primary battery protection switches arranged in complementary pairs, wherein the primary battery protection switches are selectively operable to couple the plurality of cells in:
  a parallel configuration in which the cells are coupled to the battery bus so as to charge or discharge in parallel;
  a series configuration in which the cells are coupled to the battery bus so as to charge or discharge in series; and
  an isolated configuration in which at least one of the plurality of cells is coupled to the battery bus and at least one of the plurality of cells is disconnected from the battery bus.

17. The electronic device of claim 16 wherein the electronic device operates with the cells in a series configuration to achieve faster charging of the cells.

18. The electronic device of claim 16 wherein the electronic device operates with the cells in a series configuration for supplying power to the bidirectional power input.

19. The electronic device of claim 16 wherein the electronic device operates with the cells in a parallel configuration to extend standby time of the electronic device.

20. The electronic device of claim 16 wherein the electronic device operates with the cells in a parallel configuration to improve operational efficiency by facilitating operation of the power converter in a bypass mode.

21. The electronic device of claim 16 wherein the electronic device operates with the cells in an isolated configuration to allow for monitoring of cell capacity performing cell health management functions.

* * * * *